Patented Dec. 13, 1938

2,139,995

UNITED STATES PATENT OFFICE 2,139,995

MANUFACTURE OF RUBBER STOCKS AND OF PIGMENT COMPLEXES FOR COMPOUNDING THEREWITH

Frank G. Breyer, Wilton, Conn., and John P. Hubbell, Garden City, N. Y.

No Drawing. Application October 19, 1934, Serial No. 749,096

12 Claims. (Cl. 106—23)

This invention relates to the manufacture of rubber and has for its particular objects the compounding with rubber of a composite pigment which has both reinforcing, as well as activating and/or accelerating effects on the rubber compound, and which pigment is considerably more effective than the components thereof would be were they added to the rubber separately in the same proportion as they exist in such pigment. Further objects of the invention are hereinafter set forth.

In rubber compounding two different types of materials are commonly used in addition to crude rubber, namely chemically reactive substances and other substances which are introduced for their physical effects. Sulphur, accelerators, activators of accelerators, and anti-oxidants are examples of the chemically reactive materials generally used; while reinforcing pigments, fillers and coloring agents are added largely or wholly for their physical effects. Some commonly used materials combine both functions. Zinc oxide, for example, when added in considerable quantities, is a useful reinforcing pigment. Even when other reinforcing pigments are used, however, or when no reinforcing effect is desired, from 3% to 5% of zinc oxide is commonly added because it reacts in the rubber compound to activate, or make more effective, the organic accelerators which are essential ingredients in nearly all modern rubber stocks.

It is well known that the smaller the particle size of a given pigment, as it is distributed in the rubber compound, the greater is its reinforcing effect in rubber. The most effective reinforcing pigments, carbon black and zinc oxide, are made by fuming processes in which the primary particles are very fine and are formed in a relatively dry gaseous medium and can be separated and introduced into the rubber with little opportunity for secondary particles of larger size to form.

Reinforcing pigments, made by processes in which the primary particles though very fine are suspended in water or other liquids so that they must be separated and dried before introducing them into the rubber are much poorer reinforcing agents probably because secondary particles or agglomerates of relatively large size are formed during filtering and drying which are never completely broken down on the rubber mill. Thus, notwithstanding the fact that many satisfactory methods are known by which pure zinc oxide can be made by precipitating it from solutions of soluble zinc salts and the zinc oxide made in this way is purer and less costly than the fumed product, nevertheless, so far as we are aware, rubber compounders universally demand the fumed product.

At present, because of its cost, zinc oxide is used largely for its chemical effect in activating accelerators rather than as a rubber reinforcing pigment and it might therefore appear that the chemically prepared product could be advantageously substituted for the fumed product. This is not the fact, however, because the reaction takes place at the surface of the zinc oxide particle, and if a uniform rubber compound is to be obtained, enough zinc oxide must be used so that particles of zinc oxide are present in each small unit mass of the final mixture. Practically it has never been possible to reduce the amount of zinc oxide used, whether in the form of the fumed or the chemically prepared product, to approximate that which is theoretically required for the activating reactions and it has been necessary to use three or more times as much in order to obtain satisfactory uniformity of distribution. Moreover practical experience has proved that because the fumed product can be more uniformly distributed in the rubber stock, less of the fumed product than of the chemically prepared product is required for activation. One of the principal advantages of our new pigment is that by its use somewhat less zinc is required for activation and, therefore, a closer approach to the theoretical amount of zinc required for activation can be made without deleteriously affecting the physical properties of the rubber stock.

We are aware that it has been proposed to use zinc hydrate instead of zinc oxide to activate accelerators because it was believed the zinc hydrate would react more quickly and completely. Here again, however, the impossibility of obtaining a thorough dispersion throughout the rubber of small amounts of zinc hydrate, counteracted any possible advantage which might have resulted from its greater reactivity.

Our investigations have led to the discovery that when a reinforcing or filling pigment, such as blanc fixe for example, whose primary particles are formed in water suspension, has a material which is chemically reactive in rubber compounds, like zinc oxide, zinc hydrate, carbonated zinc hydrate or basic zinc carbonate, precipitated on its surfaces, while it is still in water suspension, and the resulting pigment complex is washed and dried in accordance with our invention, the pigment complex so made, when introduced into a rubber compound, has more reinforcing value than the same quantity of a blanc fixe prepared in the ordinary way from the same slurry, but separately introduced into a similar rubber stock. At the same time somewhat less of the chemically reactive material is required in the rubber compound in order to obtain the desired physical properties of the rubber when such reactive material is introduced as a component part of our pigment than would be the case if the reinforcing and reactive materials had been added separately. Apparently each of these materials influences the other and inhibits the tendency of each to form agglomerates.

An especially desirable zinc compound for use in the preparation of our improved pigment complex is a carbonated zinc hydrate whose composition is approximately that which would be obtained by mixing two molecules of zinc hydrate ($Zn(OH)_2$) with one molecule of zinc carbonate ($ZnCO_3$), and which can be conveniently prepared by the precipitation of zinc from solutions of soluble zinc salts with alkali or ammonium carbonates. While this compound has undoubtedly been heretofore prepared, nevertheless no one has ever prior to our invention proposed to employ the same in compounding rubber to activate the organic accelerators and otherwise improve the rubber stocks. All previous experimenters have calcined the carbonated zinc hydrate to remove the combined water and the carbon dioxide before introducing it into rubber.

Without being in any way limited by theoretical considerations, we think the increased efficiency of the zinc in the new pigment is due to a greater reactivity of the carbonated hydrate component as compared to the oxide and to better dispersion of the zinc in the rubber when it is introduced into the rubber mix as one component of a pigment.

The way by which various pigments are prepared to take advantage of our invention, can best be understood, we believe, by describing the preparation of pigments in which blanc fixe (precipitated barium sulphate) is the inert base and carbonated zinc hydrate is the reactive material precipitated thereon, but it is to be understood that we do not intend to limit the invention to the employment of blanc fixe as a carrier for the reactive zinc compounds, since any other rubber filler or reinforcing pigment which can be dispersed in a solution of zinc may be used; and furthermore, our invention is not to be limited to the use of carbonated zinc hydrate as the reactive material, since other reactive zinc compounds, such as a hydrate or the oxide may be formed, and the broad principles of our invention may be utilized to improve the efficiency of other materials which are reactive in rubber mixes, provided they are capable of being precipitated from a solution upon particles of inert material suspended therein.

To form a pigment of blanc fixe and carbonated zinc hydrate, we prepare a slurry of freshly precipitated and washed blanc fixe. We mix a predetermined amount of this slurry with a sufficient amount of a solution of a soluble zinc salt, such as zinc sulphate, to furnish the zinc required to form a pigment of the predetermined desired ratio of blanc fixe to carbonated zinc hydrate. To this mixture we add just enough of a solution of sodium or ammonium carbonate, or a mixture of sodium or ammonium carbonate with ammonium hydroxide, to completely precipitate the zinc. The precipitate is washed with a dilute sodium or ammonium carbonate solution until the sulphates are all removed and then with water to remove the excess sodium or ammonium carbonate. The washed precipitate is separated and dried in the manner hereinafter described, at temperatures considerably lower than a normal calcining temperature.

The following examples describe the preparation of the pigments which were employed in the tests hereinafter referred to and will serve to teach the method by which pigments of predetermined composition may be prepared.

*Example 1.*—1,000 gallons of an aqueous slurry containing about 21% by weight of thoroughly washed precipitated barium sulphate, viz: about 0.226 gram per cc., is diluted with 2,000 gals. of pure water and to the diluted mixture about 118 gals. of a 20% zinc sulphate solution, previously purified in a known manner, is added with thorough agitation. The mixture is heated preferably to between 160–170° F. and about 70 gals. of a 20% solution of ammonium carbonate is then slowly added with continuous stirring. The solids resulting from the reaction are separated from the bulk of the solution and repeatedly washed with a $\frac{1}{10}$% ammonium carbonate solution in order to remove the ammonium sulphate produced in the reaction. Following the removal of such sulphate, the solids are then repeatedly washed with pure water to remove any residual ammonium carbonate. The washed cake is then carefully dried on a drum drier at a temperature preferably between 200–220° F. and for only as long as is necessary to produce a dry powder which can be easily milled into rubber. It is necessary that the product be dry so that it will be susceptible of being readily incorporated into rubber stock and it is especially desirable that the zinc present in the final product be in hydrated form. Consequently we prefer to carry out the drying operation in such a manner that as little of the combined water of the zinc hydrate is removed as is consistent with obtaining a dry powder which mixes easily in rubber stocks. The dried product so obtained will also be in a condition which admits of its incorporation into crude rubber without any further milling or disintegrating thereof. The product prepared as above described will contain the equivalent of 4.81% of zinc oxide and will have a specific gravity of about 4.01.

*Example 2.*—400 gals. of a pure 20% zinc sulphate solution is added with constant stirring to 3,000 gals. of the diluted barium sulphate slurry prepared as aforesaid. While the mixture is heated to about 160–170° F., approximately 415 gals. of a 12.5% sodium carbonate solution are added with constant stirring. The precipitated solids are separated, washed and dried in the manner described in the foregoing example. The resultant product will contain carbonated zinc hydrate equivalent to about 13.24% of zinc oxide and will have a specific gravity of about 3.92.

*Example 3.*—2,520 gals. of a pure 20% zinc sulphate solution are added to 1,000 gals. of a pure barium sulphate slurry containing about .254 gram of barium sulphate per cc. of slurry. The mixture is heated to about 160–170° F. and then approximately 2,800 gals. of a 12.5% sodium carbonate solution are slowly added with constant stirring. The precipitated solids are separated, washed and dried in the manner set forth in Example 1. The resultant zinc compound will be in the form of carbonate zinc hydrate and the product will analyze about 40.35% of zinc oxide.

It will be understood that a pigment having any predetermined ratio of blanc fixe to carbonated zinc hydrate may be made by adding the required amount of zinc sulphate solution to the blanc fixe slurry and then precipitating the zinc on the suspended blanc fixe by adding the requisite amount of ammonium or sodium carbonate solution to the mixture. It will be further understood that while we have found the concentrations of the various solutions given in the above examples to give satisfactory results, the invention is in no way limited to these concentrations. So long as the blanc fixe remains well distributed, the blanc fixe slurry may be more or less dilute. Zinc sulphate and ammonium or sodium carbonate solutions of any desired concentration may be used.

If desired, uncarbonated zinc hydrate may be precipitated on an inert base such as blanc fixe by treating the mixture of blanc fixe slurry and zinc sulphate solution with ammonium hydroxide. In such a case, however, the precipitate is washed with enough sodium or ammonium carbonate solution to remove practically all of the sulphate and such washing operation will convert such precipitated zinc hydrate into carbonated zinc hydrate or a basic zinc carbonate. Even very small amounts of sulphate in the complex when it is added to rubber will tend to materially reduce the activity of the zinc.

The principles outlined above may be utilized in compounding other pigment materials. For example, the desired amount of calcium hydrate may be precipitated upon blanc fixe by adding to a suspension of blanc fixe a solution of soluble calcium salt, such as calcium acetate or calcium nitrate. In a similar way any desired amount of magnesium oxide or lead oxide may be precipitated upon blanc fixe. Other base pigments may be used besides precipitated barium sulphate, for example treated clay. If it is desired to precipitate zinc upon such bases, care must be taken that the soluble zinc salt does not react with the base material in a deleterious fashion.

Although we have described the use of ammonium and sodium carbonates as the precipitant in the above examples, other precipitants, such as mixtures of sodium, potassium and ammonium carbonates or of any of these carbonates with ammonium, sodium or potassium hydroxides may be employed in lieu thereof in the production of our improved pigments with very satisfactory results. If a mixture of carbonates and hydroxides is used we prefer ammonium hydroxide to either sodium or potassium hydroxide because of the ease with which the ammonium salts can be washed from the precipitate. For the same reason we prefer to wash with ammonium carbonate, although other equivalent carbonates may be used.

The presence of carbonated zinc hydrate on the surface of the blanc fixe particles definitely inhibits the formation of large secondary agglomerates of blanc fixe or causes such agglomerates, if they do form to be more readily broken down in the rubber mill, while the fact that the carbonated zinc hydrate is thoroughly distributed over the blanc fixe materially facilitates its later complete dispersion in the rubber compound. Irrespective of the theory advanced the fact remains that our improved pigment yields a rubber stock having improved physical characteristics when compared to a rubber stock containing the same amounts of blanc fixe and the same amounts of zinc, as zinc oxide, added separately. Furthermore, when certain definite physical properties are required in a rubber compound, the desired results may be obtained more economically with our new pigment, than if the blanc fixe and the zinc compounds are added separately and exist separately in the resultant rubber mix as is now the universal practice in rubber factories.

The novel properties of our pigment are graphically demonstrated by comparative tests made in rubber stocks. Since both components of the pigment are more effective in rubber stock than the same amount of each would be if introduced into the stock separately, the rubber compounder may take advantage of these pigments in any of the following ways:—

(a) He may use the same amount of total pigment with the same ratio of reinforcing pigment to chemically active material and obtain a rubber stock having superior physical properties. Test #1 below illustrates such way of utilizing the product of this invention. This test shows an improvement of approximately 10% in the physical properties of the stock containing our new composite pigment.

(b) He may reduce the amount of reinforcing pigment, keeping the zinc oxide content of the stock about the same, and obtain a rubber stock with equal physical properties. Test #2 below illustrates such way of utilizing the product of this invention. The results obtained show that with the same zinc oxide content there is a saving of over 25% in the amount of blanc fixe required.

(c) He may reduce the amount of chemically active material, keeping the amount of reinforcing pigment about the same, and yet obtain equal physical properties in the resulting rubber stock. Test #3 below shows that by the use of our pigment the zinc oxide content of a stock may be reduced over 50% without impairing the physical properties of the stock.

(d) He may substitute for zinc oxide a pigment containing a high ratio of zinc oxide to blanc fixe, in stocks where zinc oxide is used only for its chemical effects and other reinforcing pigments than blanc fixe are depended upon to give the stock toughness and wear resistance. Test #4 compares two tread stocks which are identical except that the zinc oxide used in the standard stock is replaced by a pigment, which contains carbonated zinc hydrate equivalent to 40.35% zinc oxide. Thus in such a case, as is apparent, our invention makes it possible to obtain the same results using but 2.42 parts of zinc oxide where otherwise 6 parts of zinc oxide would be required.

TEST No. 1

The following rubber stocks were made:—

| | Stock A | Stock B |
|---|---|---|
| Smoked sheets | 100.00 | 100.00 |
| Sulphur | 2.00 | 2.00 |
| Stearic acid | 0.50 | 0.50 |
| Ureka C | 0.69 | 0.69 |
| Guantal | 0.56 | 0.56 |
| Blanc fixe | 40.00 | 38.8 |
| Zinc oxide (Kadox) | 4.00 | 3.8 |
| Pigment #1 | | 44.00 |

Pigment #1 contained 88.2% blanc fixe +11.8% carbonated zinc hydrate, equivalent to 8.6% zinc oxide. Stock B, therefore, contained 38.8 parts (44x.882) blanc fixe and an amount of carbonated zinc hydrate equivalent to 3.8 parts zinc oxide (44x.086).

These stocks, were cured as indicated in the table, and, when tested, gave the following results:—

*Stock A*

|  | Cure @ 20# pressure | | |
| --- | --- | --- | --- |
|  | 30 min. | 45 min. | 60 min. |
| Pounds per square inch in tensile @ 500% elongation | 1090 | 1280 | 1240 |
| Pounds per square inch in tensile @ 700% elongation | 3075 | 3675 | 3710 |
| Pounds per square inch in tensile break | 3595 | 2890 | 4095 |
| Elongation at break percent | 730 | 710 | 720 |

*Stock B*

|  | Cure @ 20# pressure | | |
| --- | --- | --- | --- |
|  | 30 min. | 45 min. | 60 min. |
| Pounds per square inch in tensile @ 500% elongation | 1125 | 1335 | 1380 |
| Pounds per square inch in tensile @ 700% elongation | 3120 | 3690 | 3840 |
| Pounds per square inch in tensile break | 3850 | 4070 | 4035 |
| Elongation at break percent | 750 | 725 | 710 |

TEST No. 2

The following rubber stocks were prepared:—

|  | Stock C | Stock D |
| --- | --- | --- |
| Smoked sheets | 100 | 100 |
| Sulphur | 2 | 2 |
| Stearic acid | .50 | .50 |
| Ureka C | .69 | .69 |
| Guantal | .56 | .56 |
| Blanc fixe | 40 | 29.5 |
| Zinc oxide (Kadox) | 5 | 4.77 |
| Pigment #2 |  | 36 |

Pigment #2 contained 81.9% blanc fixe and 18.1% carbonated zinc hydrate, equivalent to 13.24% zinc oxide. Stock D, therefore, contained 29.5 parts blanc fixe and an amount of carbonated zinc hydrate equivalent to 4.77 parts zinc oxide.

These stocks were cured as indicated in the table, and, when tested, gave the following results:—

*Stock C*

|  | Cure @ 20# pressure | | |
| --- | --- | --- | --- |
|  | 30 min. | 45 min. | 60 min. |
| Pounds per square inch in tensile @ 300% elongation | 426 | 488 | 493 |
| Pounds per square inch in tensile @ 500% elongation | 1263 | 1490 | 1468 |
| Pounds per square inch in tensile break | 3710 | 3995 | 3780 |
| Elongation at break percent | 725 | 720 | 700 |

*Stock D*

|  | Cure @ 20# pressure | | |
| --- | --- | --- | --- |
|  | 30 min. | 45 min. | 60 min. |
| Pounds per square inch in tensile @ 300% elongation | 435 | 489 | 519 |
| Pounds per square inch in tensile @ 500% elongation | 1340 | 1455 | 1603 |
| Pounds per square inch in tensile break | 3735 | 4030 | 4220 |
| Elongation at break percent | 715 | 720 | 725 |

TEST No. 3

The following rubber stocks were prepared:—

|  | Stock E | Stock F |
| --- | --- | --- |
| Smoked sheets | 100 | 100 |
| Sulphur | 2 | 2 |
| Stearic acid | .50 | .50 |
| Ureka C | .69 | .69 |
| Guantal | .56 | .56 |
| Blanc fixe | 40 | 42 |
| Zinc oxide (Kadox) | 5 | 2.16 |
| Pigment #3 |  | 45 |

Pigment #3 contained 93.4% blanc fixe and 6.6% carbonated zinc hydrate equivalent to 4.81% zinc oxide. Stock F, therefore, contained 42.03 parts blanc fixe and an amount of carbonated zinc hydrate equivalent to 2.16 parts zinc oxide.

These stocks when cured as indicated below and, when tested, gave the following results:—

*Stock E*

|  | Cure @ 20# pressure | | |
| --- | --- | --- | --- |
|  | 30 min. | 45 min. | 60 min. |
| Pounds per square inch in tensile @ 500% elongation | 1115 | 1290 | 1345 |
| Pounds per square inch in tensile @ 700% elongation | 3180 | 3705 | 3860 |
| Pounds per square inch in tensile break | 3485 | 4050 | 3950 |
| Elongation at break percent | 725 | 725 | 705 |

*Stock F*

|  | Cure @ 20# pressure | | |
| --- | --- | --- | --- |
|  | 30 min. | 45 min. | 60 min. |
| Pounds per square inch in tensile @ 500% elongation | 1045 | 1210 | 1320 |
| Pounds per square inch in tensile @ 700% elongation | 2930 | 3790 | 3935 |
| Pounds per square inch in tensile break | 3380 | 4055 | 3965 |
| Elongation at break percent | 735 | 725 | 710 |

TEST No. 4

The following rubber stocks were prepared:—

|  | Stock G | Stock H |
| --- | --- | --- |
| Smoked sheets | 100 | 100 |
| Carbon black | 45 | 45 |
| Sulphur | 3 | 3 |
| Stearic acid | 3 | 3 |
| Pine tar | 2 | 2 |
| Ureka C | .80 | .80 |
| D. P. G. | .20 |  |
| Zinc oxide | 6 | 2.42 |
| Pigment #4 |  | 6 |

Pigment #4 analyzed 45.1% blanc fixe and 65.9% carbonated zinc hydrate equivalent to 40.35# zinc oxide. Stock H, therefore, contained 2.7 parts blanc fixe and an amount of carbonated zinc hydrate equivalent to 2.42 parts zinc oxide. These stocks were cured as indicated below and, when tested, gave the following results:—

*Stock G*

|  | Cure @ 30# pressure | | | |
| --- | --- | --- | --- | --- |
|  | 60 min. | 75 min. | 90 min. | 105 min. |
| Pounds per square inch tensile @ 300% elongation | 1545 | 1645 | 1730 | 1840 |
| Pounds per square inch tensile @ 500% elongation | 3210 | 3220 | 2660 | 3700 |
| Pounds per square inch tensile break | 4215 | 4240 | 4160 | 4170 |
| Elongation at break percent | 615 | 585 | 555 | 555 |

Stock H

|  | Cure @ 30# pressure | | | |
|---|---|---|---|---|
|  | 60 min. | 75 min. | 90 min. | 105 min. |
| Pounds per square inch tensile @ 300% elongation | 1350 | 1503 | 1428 | 1370 |
| Pounds per square inch tensile @ 500% elongation | 2950 | 3210 | 3270 | 2110 |
| Pounds per square inch tensile break | 3900 | 4115 | 4050 | 3885 |
| Elongation at break percent | 615 | 595 | 575 | 575 |

The term "pigment" is used herein to denote a finely divided dry powder which is substantially insoluble in a rubber mix and which is added to the rubber mix to impart certain desired properties thereto. It is not limited to materials added solely or partially for their color. A filter is a pigment-like material which is substantially inert in the rubber mix and is added solely or principally to cheapen the compound. In referring to an "uncalcined" pigment we mean a pigment which has not been heated to a temperature which would eliminate chemically combined hydroxyl or carbonate radicals.

Typical compounds of zinc which will react in rubber mixes to activate organic accelerators employed therein include zinc oxide, zinc hydrate, zinc carbonate, carbonated zinc hydrate, basic zinc carbonate and any and all mixtures of these compounds, as distinguished from the zinc salts of strong mineral acids such as zinc sulphate, chloride or nitrate, which salts do not activate organic accelerators but even tend to retard the action thereof.

It is, of course, understood that the examples given herein of pigments and of rubber stocks prepared in accordance with our invention and the details of procedure for preparing such pigments and utilizing the same in compounding rubber stocks are merely illustrative of the principles of our invention and the application thereof in the rubber industry and are in no sense to be understood as limiting the scope of our invention.

The term "chemically inert" as employed in the claims is intended to exclude those compounds which would be reactive either in the precipitation step employed in preparation of the pigment as well as in the rubber mix or in the finished vulcanized product.

Various changes and modifications thereof may be made without departing from the spirit of our invention as embraced within the scope of the appended claims.

Having thus described our invention, what we claim and desire to obtain by United States Letters Patent is:—

1. An uncalcined composite activating and filling pigment for rubber manufacture comprising a base material substantially all of which consists of finely divided blanc fixe and which has precipitated on its particles a compound of zinc with radicals from the group consisting of hydroxyl and carbonate radicals, which after drying at moderately elevated temperatures lower than a calcining temperature, is free of strong acid radicals that would impair its activating effect and is a more effective activator of organic accelerators in the vulcanization of rubber than similar quantities of said zinc compound when used alone.

2. An uncalcined composite activating and filling pigment for the vulcanization of rubber comprising a finely divided base material substantially all of which is chemically inert and adapted for use as a filling material in rubber and which has precipitated on its particles a basic zinc carbonate in such extended form that it possesses a greater activating effect on organic rubber accelerators than an equivalent amount of zinc oxide, said pigment being free of agglomerates and of strong acid radicals which would impair its activating effect.

3. An uncalcined composite pigment for rubber manufacture comprising minute particles of a chemically inert inorganic filler for rubber having a coating of an activating substance for organic rubber accelerators formed by the precipitation of a zinc compound on to a slurry of the filler by the reaction between a solution of a compound from the group consisting of alkali and ammonium hydroxides and carbonates and a solution of zinc salt, and subsequent drying of the precipitate at moderate temperatures lower than a normal calcining temperature, said pigment being free of agglomerates and deleterious strong acid radicals and containing the activating substance in a form such that its activity is superior to that of an equivalent amount of zinc oxide produced by dry processes.

4. An uncalcined composite pigment for rubber manufacture comprising minute particles of a chemically inert inorganic filler for rubber having a precipitated coating of a compound of zinc with radicals from the group consisting of hydroxyl and carbonate radicals, said compound being extended over the filler and said pigment being substantially free of agglomeration so that it is a more effective activator of organic accelerators used in the vulcanization of rubber than equivalent quantities of such compound alone, and said pigment being free of deleterious strong acid radicals.

5. An uncalcined composite pigment for rubber manufacture comprising minute particles of a chemically inert inorganic filler for rubber having a precipitated coating of an activator for organic accelerators consisting of a compound of zinc with radicals from the group consisting of hydroxyl and carbonate radicals which has been dried at moderate temperatures below a normal calcining temperature after precipitation from a solution of a zinc salt on to the particles of filler by the action of a base, said pigment being free of deleterious strong acid radicals.

6. An uncalcined filling and activating pigment for rubber manufacture comprising minute particles of precipitated blanc fixe having a precipitated coating of an activating material for organic accelerators, said activating material constituting the precipitation product of the reaction between a basic solution of a compound from the group consisting of alkali and ammonium hydroxide and carbonates and a solution of zinc sulfate, which product has been contacted with $CO_3$ ions to effect displacement of objectionable quantities of $SO_4$ ions and dried at moderate temperatures below a normal calcining temperature.

7. The method of making an uncalcined composite pigment for rubber manufacture comprising a chemically inert inorganic filler for rubber and a coating of activating material for organic rubber accelerators in highly effective condition which includes the steps of preparing an aqueous solution containing such filler in finely divided form suspended therein and containing dissolved zinc salt in a quantity sufficient to provide the ratio between filler and activator suited for treatment of the particular type of rubber compound, said salt introducing strong acid radicals into the solution, precipitating a zinc compound on to the particles of filler by reacting the solution with a solution of a compound from the group consisting of alkali and ammonium hydroxides and carbonates and contacting the precipitated compound with a solution containing CO₃ ions in an amount sufficient to displace adsorbed strong acid radicals and drying the resulting product at moderately elevated temperatures lower than a normal calcining temperature.

8. The method of claim 7 in which the composite pigment is dried at a temperature between about 200° F. and 220° F.

9. The method of claim 7 in which the precipitate is filtered, then washed with a basic solution containing CO₃ ions to displace deleterious strong acid radical and thereafter dried at a moderately elevated temperature.

10. The method of making an uncalcined composite pigment for rubber manufacture comprising an inert inorganic filler for rubber and a coating of activating material for organic rubber acelerators in highly effective condition which includes the steps of preparing a suspension in water of a finely divided inorganic filler for rubber, adding a solution of zinc sulfate in a quantity sufficient to provide the ratio between filler and activating material suited for the treatment of the particular type of rubber compound, reacting the solution with a compound from the group consisting of alkali and ammonium hydroxides and carbonates to precipitate a zinc compound on to the particles of filler, washing the precipitate with a dilute solution of ammonium carbonate to remove deleterious SO₄ ions and drying the composite pigment thus formed.

11. The method of claim 10 in which the filler material is blanc fixe.

12. In the compounding of rubber by vulcanizing the same in the presence of organic accelerators and pigments, dispersing within the rubber mix a composite uncalcined, activating and filling pigment containing minute particles of a chemically inert filler for rubber having a precipitated coating of a zinc compound formed by the reaction between a solution of zinc sulfate and a basic solution of a compound from the group consisting of alkali and ammonium hydroxides and carbonates, contacting the precipitated coating with a solution containing CO₃ ions and drying the product, said compound being substantially free of deleterious strong acid radical, thoroughly mixing the dispersion thus formed and vulcanizing the compound in the usual way.

FRANK G. BREYER.
JOHN P. HUBBELL.